United States Patent [19]

Powell et al.

[11] Patent Number: 5,111,126

[45] Date of Patent: May 5, 1992

[54] STEREO OPTICAL GUIDANCE SYSTEM FOR CONTROL OF INDUSTRIAL ROBOTS

[75] Inventors: Bradley W. Powell, Athens; Mike H. Rodgers, Huntsville, both of Ala.

[73] Assignee: Applied Research, Inc., Huntsville, Ala.

[21] Appl. No.: 573,357

[22] Filed: Aug. 27, 1990

[51] Int. Cl.$^5$ ............................ H01J 3/14; B23K 9/12
[52] U.S. Cl. .......................... 318/568.16; 318/568.1; 318/577; 250/216; 901/42; 901/47; 359/727; 395/1
[58] Field of Search ............................ 318/577; 358/3; 219/124.34, 130.01; 356/376; 250/216; 350/444; 901/42, 47; 364/513

[56] References Cited

U.S. PATENT DOCUMENTS 4,978,843 12/1990 Yamakawa .......................... 250/216

*Primary Examiner*—Paul Ip
*Attorney, Agent, or Firm*—John C. Garvin, Jr.; James E. Staudt

[57] ABSTRACT

A device for the generation of basic electrical signals which are supplied to a computerized processing complex for the operation of industrial robots. The system includes a stereo mirror arrangement for the projection of views from opposite sides of a visible indicia formed on a workpiece. The views are projected onto independent halves of the retina of a single camera. The camera retina is of the CCD (charge-coupled-device) type and is therefore capable of providing signals in response to the image projected thereupon. These signals are then processed for control of industrial robots or similar devices.

20 Claims, 2 Drawing Sheets

5,111,126

STEREO OPTICAL GUIDANCE SYSTEM FOR CONTROL OF INDUSTRIAL ROBOTS

ORIGIN OF THE INVENTION

This invention was made with Government support under NAS8-36200 awarded by NASA. The Government has certain rights in this invention.

TECHNICAL FIELD

The invention relates to a stereo optical system for locating a visible indicia on a workpiece and for producing output signals which may be processed for the actuation of an industrial robotic device. The robotic device may be utilized to operate many types of industrial equipment, such as welders, x-ray machines, adhesive applicators, riveting machines, and other similar devices.

BACKGROUND OF THE INVENTION

The invention will be described for illustration in the context of a robotic arc-welding, seam tracking system. However, the system is equally effective for guidance and control of any type of industrial robot which is required to locate and/or track indicia on a workpiece. The indicia may be in the form of a dot, a hole, a line, a groove, a seam or a similarly indicated path or point.

The use of optically controlled seam trackers in conjunction with robotic welders has been extensive in recent years. Examples of such systems are found in the following U.S. Patents: Taft et al U.S. Pat. No. 4,833,381 issued May 23, 1989; Gordon U.S. Pat. No. 4,831,233 issued May 16, 1989; Richardson U.S. Pat. No. 4,737,614 issued Apr. 12, 1988; Shibata et al U.S. Pat. No. 4,667,082 issued May 19, 1987; Polick et al U.S. Pat. No. 4,590,356 issued May 20, 1986; Smith et al U.S. Pat. No. 4,567,348 issued Jan. 28, 1986; and Richardson U.S. Pat. No. 4,501,950 issued Feb. 26, 1985.

Review of previous systems reveals critical shortcomings in the systems capabilities to provide an effective and inexpensive means of providing three dimensional guidance for robotic welding apparatus. It will be noted that these devices are not capable of providing a usable 3-D optical image of the seam unless the seam is grooved or spaced.

By use of the stereo vision concept with a single camera the present invention provides features not possible with the above listed or any known prior art. In addition to the ability of the present invention to track accurately, the stereo vision concept permits precise quantitative three dimensional control of an industrial robot. Use of a single camera, rather than two cameras, not only halves the camera costs but greatly simplifies the system electronics and reduces the size of the program software.

SUMMARY OF THE INVENTION

The present invention provides an improved optical system for the generation of basic electrical signals which are supplied to a computerized processing complex for the operation of industrial robots. The system includes a stereo mirror arrangement for the projection of views from opposite sides of a visible indicia formed on a workpiece. The views are projected onto halves of the retina of a single camera. The camera retina is of the CCD (charge-coupled-device) type and is therefore capable of providing signals in response to the image projected thereupon. These signals may then be processed for control of industrial robots or similar devices.

DESCRIPTION OF THE PREFERRED EMBODIMENT

Figure 1:
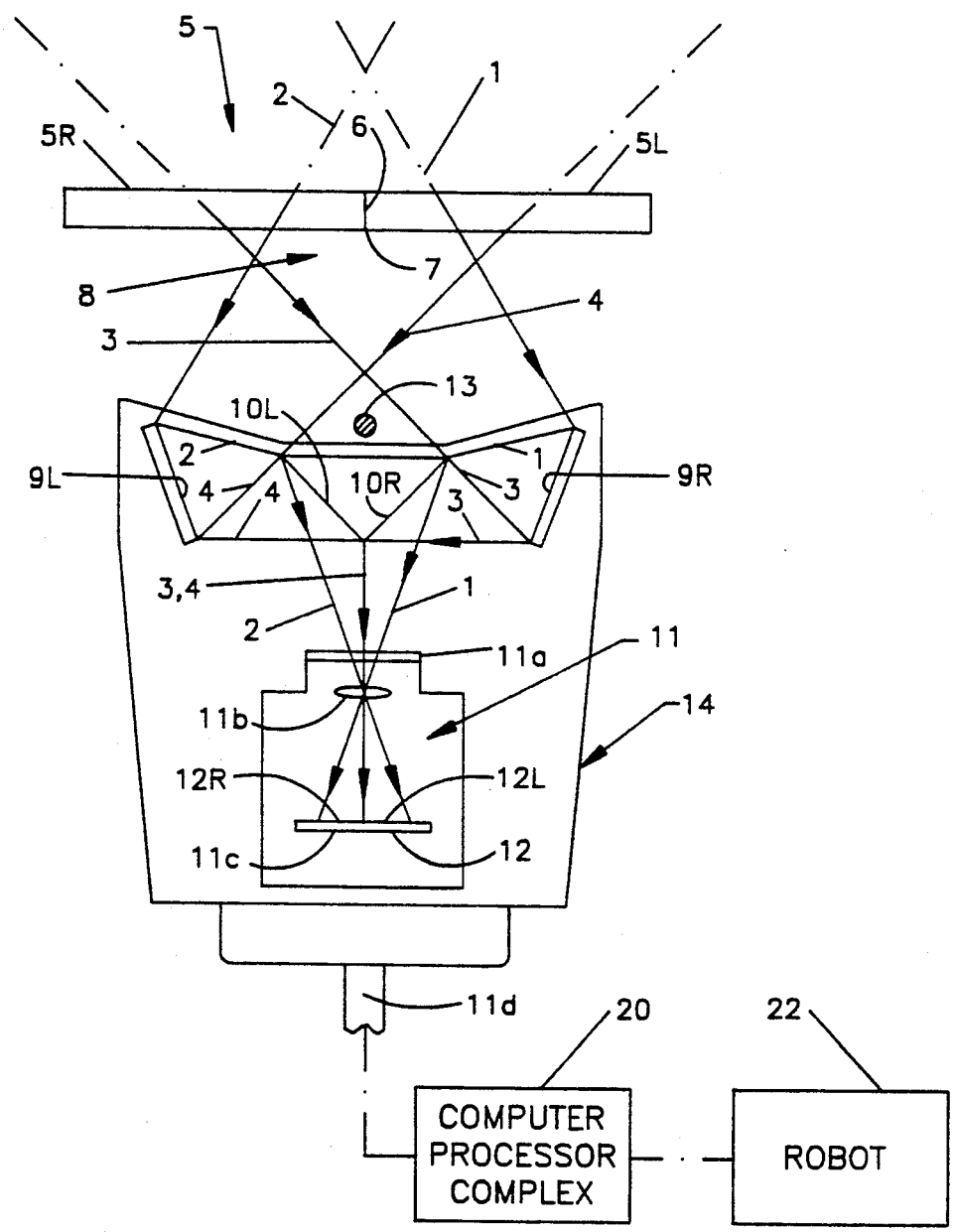
FIG. 1 is a diagrammatic illustration of the invention showing in particular the arrangement of optical components and the resultant light paths.

As illustrated in FIG. 1, this stereo guidance system includes a housing 14, which encloses mirrors 9L, 9R, 10L and 10R, a camera 11, a light filter 11a, a lens 11b and a retina 12. The retina 12 of the camera 11 is of the CCD (charge-coupled-device) type which converts the image formed thereon into electrical signals which are transmitted by a cable 11d to a computer, processor complex 20, for operation of industrial type robots 22.

The mirrors 9L, 9R, 10L and 10R include the alphabetic left and right hand designations to simplify the description of the optical paths and the configuration of the system. Further, it will be noted that the mirrors 9L and 9R are located near the outer portion of the system and will be referred to as peripheral mirrors while the inwardly located mirrors 10R and 10L will be referred to as center mirrors.

As illustrated, the peripheral mirrors 9L and 9R direct light to the central mirrors 10L and 10R which in turn direct the light into the camera lens 11b. Because of the spaced apart, or stereoscopic locations of the left and right mirrors, two separate images will be impinged upon the retina 12 of the camera. One image is impinged upon each of the left and right portions 12L and 12R of the retina 12.

A workpiece 5 includes two metal portions 5L and 5R which are intended to be welded at a seam 6. It will be noted that seam 6 forms an indicia 7 which defines a line which is the only visible portion of the seam as seen by the system optics.

The indicia or visible line 7 is located within a simultaneous viewing polygon 8 which is defined by extreme undeviated rays 1, 2, 3, and 4. Light reflected to the left by the apparent line 7 will travel along the imaginary corridor bounded by rays 2 and 4, striking in turn mirrors 9L and 10L, filter 11a, lens 11b and will finally illuminate a line of pixels (image 12L) on the right half of the CCD array retina 12. Similarly light from the indicia 7 which is scattered in a rightward direction will travel along the imaginary corridor bounded by rays 1 and 3 and strike in turn mirrors 9R and 10R, pass through the filter 11a and the lens 11b, and will form the image 12R on the left half of the CCD array retina. It is understood that indicia of any type whether it be a hole, a dot, a line, a seam, or any visible marking which is located within the simultaneous viewing polygon 8 will be quantitatively locatable in three dimensions by the CCD retina.

Initial set-up adjustments of the system include a precise predetermined orientation of the workpiece to the system. This orientation is based upon a mathematical model of the relative positions of the optical components of the system. Thus, after such orientation it will be clear that indicia on the workpiece may be precisely located and that relative movement between indicia on the workpiece and the stereo system will be reproduce in the images which illuminate lines of pixels on the retina 12. The retina, being of the CCD array configuration, produces basic signals which, when received by a properly programmed computer, processor complex 20, may be processed to control the movement and operation of various types of industrial robots 22. The CCD array provides signals which vary in accordance with the intensity of the light which strikes it in any given area. This permits the system to react precisely to the varying shades of light of an image projected upon the array. This feature is referred to as "gray-scale" processing. Such computer and processing equipment is well known in the art and is therefore not illustrated in detail in the drawings. Use of cameras having a CCD or similar capability in conjunction with a computer, processor complex for operation of industrial robots is illustrated in Smith et al U.S. Pat. No. 4,567,348 issued Jan. 28, 1986 which is cited as related art earlier in the application.

Figure 2:
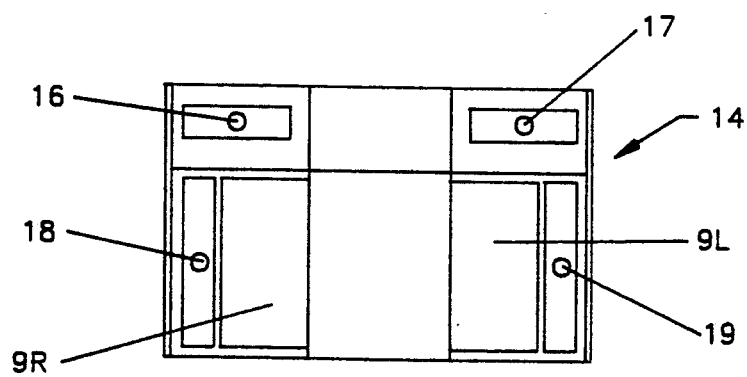
FIG. 2 is a frontal view illustrating the arrangement of the mirrors and the laser illuminators of the invention.

FIG. 2 is a frontal view of the stereo vision system which illustrates the location of laser diode illuminators 16 through 19 relative to the peripheral mirrors 9L and 9R. The numerals 16 and 17 indicate linear laser diode illuminators mounted above the peripheral mirrors while global illuminators 18 and 19 are located outwardly from the mirrors. The global laser diode illuminators 18 and 19 provide general illumination of the workpiece while the linear laser diode illuminators 16 and 17 provide a structured stripe of intense light which is precisely directed to the indicia to be located or tracked.

Figure 3:
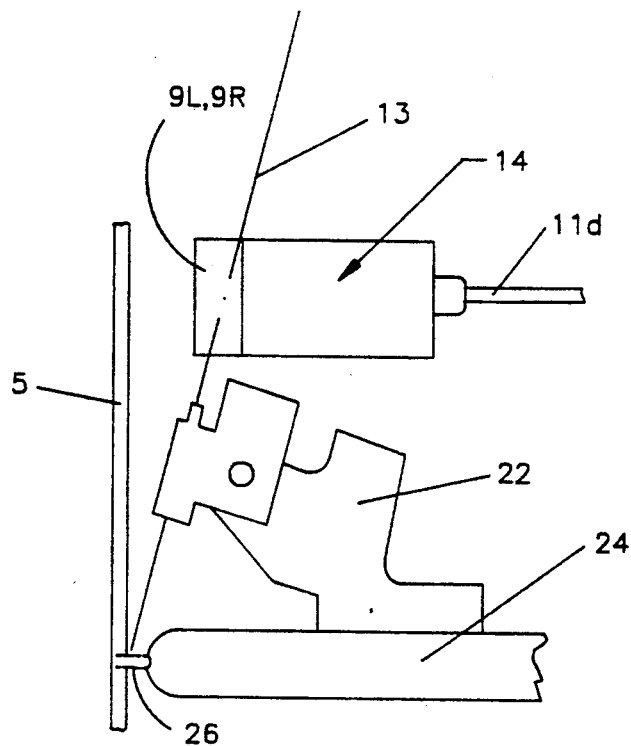
FIG. 3 is a diagrammatic view of the invention illustrating its use with a robotic welding machine.

FIG. 3 is a diagrammatic view of the arrangement of elements of the stereo vision system illustrated as applied to a robotic welding system. As an additional important feature of the invention, it will be noted that a welding wire 13, also illustrated in FIG. 1, is positioned between the peripheral mirrors of the system whereby the images received on the peripheral mirrors are not impeded by the wire. A wire feed positioner 22 is attached to a welding torch assembly 24. The torch 24 ejects a plasma stream 26 to effect the welding process.

In operation, the stereo vision system collects visual information necessary to locate and track indicia on the workpiece 5. This indicia may be in the form of a visible line, a marked point, a hole, or as illustrated, the line or indicia 7 as formed by seam 6 between the pieces of metal 5L and 5R to be welded together. This collection of visible information is accomplished by forming two images 12L and 12R of the visible indicia 7 on the CCD array or retina 12. This information (image 12L and image 12R) is combined with a precise mathematical model including the internal dimensions of the optical elements of the stereo vision sensor. The computer processor complex 20, appropriately programmed, will then deduce the precise location in space of indicia 7 with respect to the optics of the system. Knowing the location of the indicia 7 allows the computer to generate appropriate commands to a torch positioning device 22, keeping the torch aligned with, and properly spaced from, the indicia 7 during the welding process.

Initially the pieces to be welded, 5L and 5R, are positioned appropriately with respect to the optics of the system, that is, their visible common boundary, which the system views as indicia 7, lies within the simultaneous viewing polygon 8, defined approximately by the extreme undeviated rays 1, 2, 3, and 4. Thus it will be apparent that light reflected to the left by the apparent line or indicia 7 will travel along the imaginary corridor bounded by rays 2 and 4, striking in turn mirrors 9L and 10L, pass through filter 11a, and lens 11b, and will finally illuminate a line of pixels (image 12L of indicia 7) on the right half of the CCD array 12. Similarly, light from the visible part of the seam 7 which is scattered in a rightward direction will travel along the imaginary corridor bounded by rays 1 and 3 and strike in turn mirror 9R and mirror 10R, pass through filter 11a and lens 11b, and will form an image 12R of indicia 7 upon the left half of retina 12. Impingement of the images of the indicia upon the half portions 12L and 12R of the retina 12 will illuminate a line of pixels in the central area of each half of the retina. It will be seen that any change in the distance between the indicia 7 and the optics systems will be instantly sensed as a change in distance between the illuminated lines on the retina 12. Thus it will be appreciated that the stereo feature of this system provides the ability of the system to instantly react not only to length and width movements, but also to the very important third dimension of depth or distance. This feature is particularly useful in voltage controlled welding systems wherein the distance between the welding head and the workpiece is constantly changing to effect the best possible welding process. As previously mentioned the CCD type array included in retina 12 will react to images and image changes by production of output signals which are processed to effect guidance and control of various types of industrial robots 22.

While certain preferred embodiments of the present invention have been disclosed in detail, it is to be understood that various modifications may be adapted without departing from the spirit of the invention or scope of the following claims.

What is claimed is:

1. A stereo optical system for locating indicia on a workpiece, said system comprising:
 a camera means for receiving reflected images of said indicia, said camera means having a retina, and a lens spaced apart from said retina so as to focus said reflected images upon said retina;
 a pair of center mirrors, each of said center mirrors being disposed to reflect an image through said lens and upon one half of said retina;
 a pair of peripheral mirrors, each of said peripheral mirrors being disposed to reflect an angular image of said indicia upon one of said pair of center mirrors.

2. The stereo optical system set forth in claim 1 wherein said retina is a charge coupled device which converts the image reflected thereupon into electrical signals which are adapted for transmittal to selected computer, processing equipment for guidance and control of a robotic device.

3. The stereo optical system set forth in claim 2 wherein said electrical signals include gray scale signals whereby variations of shades of the reflected images may be reproduced and acted upon by said processing equipment.

4. The stereo optical system set forth in claim 2 wherein said system is adapted to receive selected ancillary components disposed between said peripheral mirrors whereby said mirrors may receive images of said workpiece without viewing interference from said ancillary components.

5. The stereo optical system set forth in claim 2 including artificial light means for illuminating said indicia.

6. The stereo optical system set forth in claim 5 wherein said light means comprises at least one laser illuminator.

7. The stereo optical system set forth in claim 6 wherein said light means comprises at least one laser illuminator located on each of opposite sides of said indicia on said workpiece.

8. The stereo optical system set forth in claim 7 wherein each said laser illuminator is located adjacent one of said peripheral mirrors.

9. The stereo optical system set forth in claim 6 wherein said light means comprises at least one said laser illuminator located above each of said peripheral mirrors, and at least one said laser illuminator located outwardly of each of said peripheral mirrors.

10. The stereo optical system set forth in claim 9 wherein each said laser illuminator located above each said peripheral mirror illuminates said indicia with a linearly structured beam.

11. The stereo optical system set forth in claim 9 wherein each said laser illuminator located outwardly of said peripheral mirrors illuminates said indicia with a diffused light.

12. The stereo optical system set forth in claim 9 wherein each said laser illuminator located above said peripheral mirrors illuminates said indicia with a linearly structured beam and, wherein each said laser illuminator located outwardly of said peripheral mirrors illuminates said indicia with a diffused light.

13. The stereo optical system set forth in claim 12 wherein a light filter is disposed between said lens and said pair of center mirrors for the passage only of light of predetermined desirable wave lengths.

14. A stereo optical system for locating indicia on a workpiece, said system comprising:

a housing;
a pair of peripheral mirrors disposed in spaced relation on said housing, each of said peripheral mirrors disposed for receiving and reflecting an image of said indicia;
a pair of center mirrors, each of said center mirrors being disposed for receiving said reflected image from one of said spaced peripheral mirrors and for reflecting said received image;
a camera means for receiving each said reflected image of said indicia from said center mirrors, said camera means having a retina and a lens spaced apart from said retina and disposed with respect to said center mirrors so as to focus one of said reflected images upon each one half of said retina.

15. The stereo optical system set forth in claim 14 wherein said housing is provided with a forward portion having a central portion and a pair of side portions disposed in angular relation with said central portion.

16. A stereo system set forth in claim 15 wherein said system is adapted to receive selected ancillary components.

17. A stereo system set forth in claim 16 wherein at least one of said ancillary components is located adjacent said central portion of said housing.

18. A stereo system set forth in claim 17 wherein each of said peripheral mirrors are mounted on said side portions whereby said peripheral mirrors are disposed to "look around" said ancillary equipment.

19. The stereo optical system set forth in claim 14 wherein said retina is a charge coupled device which converts the images reflected thereupon into electrical signals which are adapted for transmittal to selected computer, processing equipment for guidance and control of a robotic device.

20. The stereo optical system set forth in claim 19 wherein said indicia is illuminated by at least one laser illuminator.

* * * * *